Aug. 21, 1956     J. H. WOLLAM     2,759,199
TRUNK TRANSPORTABLE CAMPING EQUIPMENT
Filed June 1, 1953
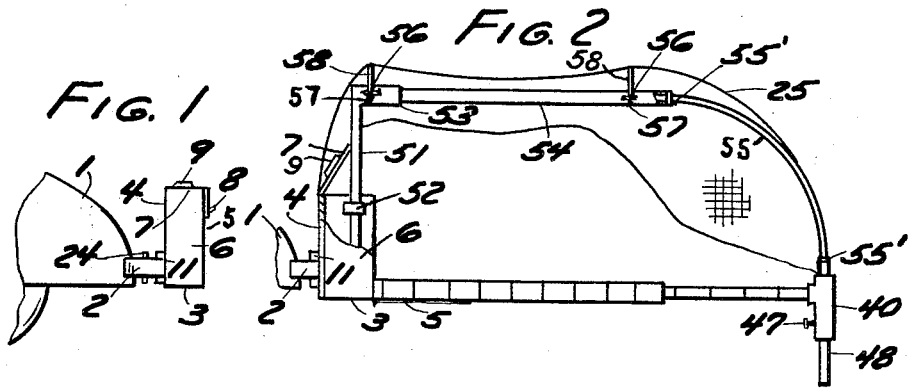
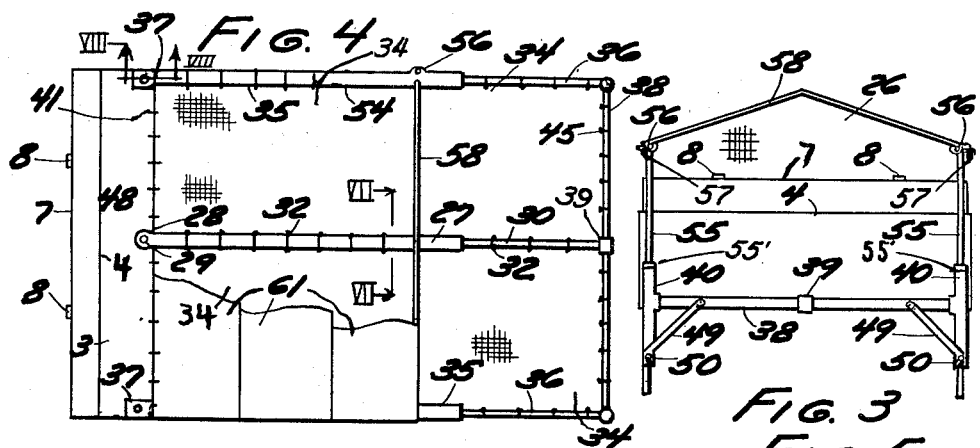
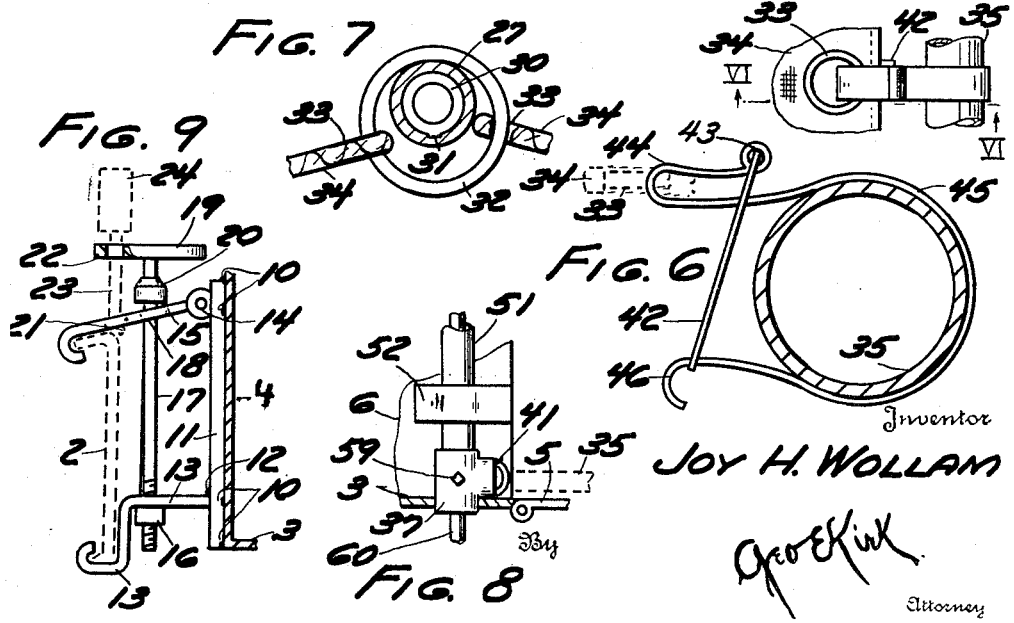
Inventor
Joy H. Wollam
Geo E Kirk
Attorney United States Patent Office 2,759,199
Patented Aug. 21, 1956

2,759,199

TRUNK TRANSPORTABLE CAMPING EQUIPMENT

Joy H. Wollam, Toledo, Ohio

Application June 1, 1953, Serial No. 358,829

1 Claim. (Cl. 5—194)

This invention relates to bed and table type of furniture constructed for compact knock-down and ready set-up handling, more particularly as adaptable to requirements of tourists and sportsmen depending upon motor vehicle transportation.

This invention has utility in adapting the knock-down equipment, as for double bed capacity, for storing in a trunk suitable for mounting upon an automobile rear bumper. The set-up may be in an extension from the bumper, or independent thereof. Accordingly, the collapsed or set-up items, may leave the automobile for independent use, as such may be desired.

Referring to the drawings:

Fig. 1 is a fragmentary view of the rear portion of an automobile in side elevation, having the trunk located on its rear bumper, for fishing, hunting, vacation, or other trip which may be planned;

Fig. 2 is a side elevation, with parts broken away of the bed set-up as extending aft from the automobile rear bumper;

Fig. 3 is a view looking from the right of Fig. 2, showing an elevation of the foot portion of the bed;

Fig. 4 is a plan view, with portions removed, to show the bed and table adaptations;

Fig. 5 is an enlarged plan view of a side or foot rail assembly clip with the canvas bed bottom grommet;

Fig. 6 is a side elevation, further enlarged of the showing in Fig. 5, of the assembly clip, as seen from the line VI—VI, Fig. 5;

Fig. 7 is a section on the line VII—VII, Fig. 4, somewhat enlarged, of the canvas bed bottom assembly with the bed mid rail;

Fig. 8 is a detail view of a portion of the trunk bottom and end, from the line VIII—VIII, Fig. 4; and Fig. 9 is a partial side elevation, on an enlarged scale, of one of the trunk and bumper connections for ready mounting and taking off, but to be locked against tampering.

Automobile 1 has a rear bumper 2. For storing and transporting, the furniture, as knocked down, it may be arranged in a carrier case or trunk having a bottom wall 3, and rigid therewith an upright wall 4. Hinged to the bottom wall 3 and adapted to swing upward parallel to the wall 4 is a wall 5. A pair of ends 6 of the case are rigid with the bottom 3 and back wall 4. A lid 7 is hinged to the top of the wall 4 and anchored to the wall 5 for completely enclosing the grips 9 (Fig. 1) on the top or lid 7 provide means for one to lift the trunk, and to place the trunk in position to be carried by the automobile 1.

By welds 10 a reinforcing plate 11 on the wall 4, a fixed mounting is provided for one of a pair of brackets or bumper connections. Welds 12 fix a lower hook 13 (Fig. 9) to the plate 11. A hinge 14 swingably mounts a hook-ended companion arm 15 adapted to engage the top inward rim of a rear bumper as the lower hook 13 embraces the bumper 2 lower edge. A nut 16 fixed to the under side of the arm 13 has threaded therein a bolt 17 extending upwardly freely thru an opening 18 in the arm 15. A hand wheel 19 fixed with the bolt 17 may be operated to bring a shoulder 20 on the bolt 17 to swing the arm 15 into positive gripping relation with the upper edge of bumper 2 to provide a carrying assembly of the trunk rigidly connected to the automobile. There is an opening 21 in the swingable hook carrying arm 15. The opening 21 is approximately in alignment with an opening 22 in the handwheel 19. A hasp 23 coacting between the openings 21, 22, may be so set by a lock 24.

With this set up of the trunk in position to be carried by the motor vehicle, one desiring access to the fully loaded trunk, may release the pair of locks 8, swing the lid 7 upwardly and the trunk side 5 to horizontal position. In the trunk there may be a weather proof tarpaulin cover 25, as well as a meshwork cover or mosquito bar alternative cover 26, which sheet materials as so stored in the trunk provide anti-rattle means for the rigid elements.

A mid rail 27 is a tube with an end eye 28 to be located over an upstanding pin 29 rigid with the bottom 3 of the trunk central portion. A relatively telescopic extension section 30 for the tubular mid rail 27 has lug and seat limit interfitting means 31 (Fig. 7) precluding sliding of the section 30 clear of the rail portion 27. Rings 32 along the rail 27, 30, extend thru grommets 33 in canvas bed bottom sections 34. The rings 32 retain the bed bottom assembly with the midrail for the storage in the trunk.

A pair of side rails 35 are each tubular with telescopic extensions 36, similar to the mid rail extension 30. Fixed to the trunk bottom 3 are independent seat-providing T-fittings 37 into which the rail portions 35 may have their forward ends thrust for locating the rails 35, 36, 27, 30, and 35, 36, in parallel. A rigid over-all unit length foot rail 38 has a central T-fitting 39 providing a socket or seat for receiving the aft end of the mid rail telescopic section 30. Four way fittings 40 at the ends of the foot rail tube 38 allow co-planar assembly of the foot rail 38, and the mid rail 27, 30, with the pair of side rails 35, 36.

Connection providing loops 41 (Fig. 8) assemble the canvas bed bottom 34 head end or edge over the trunk side 5 with the trunk bottom 3. For the outer edges and foot portions of the bed bottoms 34, spring clips are provided as detachable tension-effecting connections. An oblong rigid wire swing arm 42 (Figs. 5, 6) is connected at an eye 43 with a strap spring having a U-loop portion 44 with a wrap section 45 to a return bend free end 46 threaded thru the swing arm 42 remote from the eye 43. The loops 44 are normally assembled with grommets 33. The detachable clips 42, 43, 44, 45, 46, are thus connectable with the frame side rails to the canvas bed bottom 34 as the deck structure bed is removed from the trunk or case. With the rectangular bed frame set-up, the wraps 45 are snapped about the bed rails 35, 36, 38, and the ends 46 caught thru the swing arms 42. One who reclines on the bed section 34 now has resilient support at these clips.

The set-up has not been carried thru sufficiently for the bed to be used as such, but it is generally more convenient to connect the spring clips at this stage. Set screws 47 at the foot rail fittings 40, permit adjusting and fixing such extensions 48 for leveling or height adjusting the bed aft extent from the bumper carried forward end thereof. Hook ends of swing struts 49 from the foot rail 38 may have such free end hooks engage pins 50 on the lower portion of the fittings 40, to stabilize upward direction for the fittings 40.

The trunk ends 6 provide, for upright tubular sections 51, guides 52 in alignment with the upward arm or seat of the T-fittings 37. The upright sections 51 at the trunk have upper L-fitting ends 53 forming seats for horizontally extending eave rail sections 54. Bow extensions 55 telescope into collars 55' and thereby provide for a rigid over-all length positioning in register with upright seat portions from the fittings 40. There is thus established a rigid length for the bed in spacing the foot rail 38 from the trunk bottom 3.

The struts 49 hold the foot rail end fittings 40 at their independently adjustable lengths in upright direction. This is reinforced by eyes 56 supported from the elbows 53 and the sections 54 into which the downwardly directed free ends 57 of gable defining rods 58 may be seated in trussing the span across the bed top. These roof and eave portions provide carrying means for tarpaulin 25, as there may be desired air space protected from the weather above the occupant of the bed. As protection from insect attack, the net 26 may be spread upon the top. While these covers may be used alternatively, there may be joint use, say for screen drop portions and weather shed top.

Setscrews 59 in the fittings 37 may locate relatively telescopic downward extensions 60 as front feet for the head of the bed, as the bumper 2 is disconnected.

When the thin plywood boards 61 are to be used as a table, they may be removed from their standing-on-edge position in the trunk and laid across a portion of the bed. If the set-up be solely for the table use, the roof structure, or at least the aft extensions, need not be so projected.

What is claimed and it is desired to secure by Letters Patent is:

A furniture structure comprising a carrier case openable to provide a deck structure bed embodying a frame, a canvas bed bottom, grommets fixed to the bed bottom, and leaf spring clips detachably assembling the canvas bed bottom to the frame, said clips each having a medial frame wrap section connecting a U-loop at one end and a hook at the other end, and a swing arm extending from the loop end to engage the hook end, said U-loop having a free end located on the side of the grommet away from the hook end of the wrap section, said free end terminating in an eye, and the swing arm being pivotally mounted upon said free end by extending through said eye.

References Cited in the file of this patent

UNITED STATES PATENTS

| | | |
|---|---|---|
| 821,295 | Karr | May 22, 1906 |
| 1,150,106 | Ericson | Aug. 17, 1915 |
| 1,304,440 | Zagelmeyer | May 20, 1919 |
| 1,506,174 | Hammond | Aug. 26, 1924 |
| 1,512,725 | Thomas | Oct. 21, 1924 |
| 1,519,048 | Powell | Dec. 9, 1924 |
| 1,574,696 | Roberts | Feb. 23, 1926 |
| 1,633,820 | Long | June 28, 1927 |
| 1,733,916 | Spalding | Oct. 29, 1929 |
| 1,797,229 | Giffel | Mar. 24, 1931 |
| 2,160,958 | Critchlow | June 6, 1939 |
| 2,239,951 | Bromschwig | Apr. 29, 1941 |
| 2,243,347 | Klein | May 27, 1941 |
| 2,378,448 | Thompson | June 19, 1945 |
| 2,471,730 | Doerr | May 31, 1949 |
| 2,525,505 | Wiedman | Oct. 10, 1950 |

FOREIGN PATENTS

| | | |
|---|---|---|
| 147,458 | Australia | Oct. 26, 1936 |